United States Patent [19]

Karnowski

[11] Patent Number: 5,761,271

[45] Date of Patent: Jun. 2, 1998

[54] TELEPHONE ANSWERING DEVICE WITH IMPROVED PAGER ACCESS FEATURE

[75] Inventor: Mark J. Karnowski, Huntington Beach, Calif.

[73] Assignee: Casio PhoneMate, Inc., Torrance, Calif.

[21] Appl. No.: 588,123

[22] Filed: Jan. 18, 1996

[51] Int. Cl.[6] .................. H04M 1/24; H04M 3/08; H04M 3/22

[52] U.S. Cl. .................. 379/1; 379/67; 379/69; 379/356

[58] Field of Search .................. 379/67, 70, 74, 379/88–89, 79, 81–82, 57, 69, 95, 102, 105, 107, 142, 157, 167, 188, 199, 201, 211, 212, 217, 355, 356

[56] References Cited

U.S. PATENT DOCUMENTS

| | | | |
|---|---|---|---|
| 4,065,642 | 12/1977 | McClure . | |
| 4,072,824 | 2/1978 | Phillips . | |
| 4,737,979 | 4/1988 | Hashimoto . | |
| 4,893,335 | 1/1990 | Fuller et al. | 379/200 |
| 4,942,598 | 7/1990 | Davis . | |
| 4,961,216 | 10/1990 | Baehr et al. . | |
| 5,313,516 | 5/1994 | Afshar et al. | 379/67 |
| 5,402,466 | 3/1995 | Delahanty . | |
| 5,555,289 | 9/1996 | Hashimoto | 379/67 |
| 5,588,046 | 12/1996 | Knuth et al. | 379/67 |

FOREIGN PATENT DOCUMENTS

| | | |
|---|---|---|
| 0330856 A2 | 9/1989 | European Pat. Off. . |
| 2173071 A | 10/1986 | United Kingdom . |
| 2301982 A | 12/1996 | United Kingdom . |

OTHER PUBLICATIONS

Owner's Guide For "PhoneMate Model 8450 Answering Machine With Speakerphone" title page, p. 25 and last page, Jun., 1991, Torrance, CA.

Operating Instructions For Page-Out Model No. 2101 The Home Voice Mail/Pager Alert System, title page, pp. 1–3, 11–19, and 31, by Dynamo Dresden, Inc, San Antonio, Texas—1993.

User's Guide for the Always-N-Touch Message Notifier, Nov. 1995, Zeus Phonstuff, Norcross, Georgia, U.S.A.

*Primary Examiner*—Huyen Le
*Assistant Examiner*—Binh K. Tieu
*Attorney, Agent, or Firm*—Frishauf, Holtz, Goodman, Langer & Chick

[57] ABSTRACT

A telephone answering device, having an automatic page feature for automatically paging a user after a message has been recorded thereon, is programmed to dial the telephone number of a paging service to which the user subscribes each time a message is recorded, and to transmit at least numeric information that will ultimately be displayed on a portable pager. The numeric information can include the number of messages recorded on the telephone answering device, a caller's telephone number or a special predetermined code that lets the user know that the device is paging him. The telephone answering device is designed so as to be compatible with a wide variety of paging services and can be re-programmed if the user changes paging services. The device includes a memory that stores the digits of the paging service telephone number and automatically stores information representing the pauses and audible activity that are present between key presses during the programming process. The telephone answering device also has a test mode that allows the user to test the device, after completion of the programming process, to insure that the paging service telephone number has been stored correctly. The automatic page feature can still further be selectively enabled and disabled by the user.

18 Claims, 7 Drawing Sheets

\* CALLER ID DETECTOR IS OPTIONAL

*CALLER ID DETECTOR IS OPTIONAL

FIG. 7A 5 5 5 1 2 | 1 2 | VOX TOKEN | 1 2 3 | * 4

PAGING SERVICE TELEPHONE NO. | SECURITY CODE | MESSAGE COUNT

FIG. 7B 5 5 5 1 2 1 2 | VOX TOKEN | 3 3 | VOX TOKEN | 1 2 3 | * 4

PAGING SERVICE TELEPHONE NO. | PIN NUMBER | SECURITY CODE | MESSAGE COUNT

FIG. 7C 5 5 5 1 2 1 2 | VOX TOKEN | 6 1 8 9 9 1 0 | * | 1 2 3 | * 4

PAGING SERVICE TELEPHONE NO. | CALLER'S TELEPHONE NO. | SECURITY CODE | MESSAGE COUNT

TELEPHONE ANSWERING DEVICE WITH IMPROVED PAGER ACCESS FEATURE

BACKGROUND OF THE INVENTION

This invention relates to telephone answering devices, and more particularly to a telephone answering device with a paging function that will automatically page a user each time a caller leaves a voice message on the device, and to a method of programming the telephone answering device to access a paging service. The method of programming the device to access the paging service is such that the telephone answering device will be compatible with virtually any type of paging service.

Telephone answering devices (TADs) are well known in the art and widely used for both personal and business purposes. With the advent of remote access capability, a TAD user can retrieve messages recorded on his device from a remote location by calling the device and entering a preprogrammed security code using a touch tone telephone key pad. In most cases, the TAD user does not know if he has any messages at the time he is placing the call to his device. If he has no messages, then he has just wasted his time. It would be advantageous for a TAD user to be alerted that he has messages and then be able to call and retrieve his messages at his convenience. Also, it would be advantageous for a TAD user who is expecting an important call but who cannot stay by his telephone to be alerted when a message has been recorded on his device so that he can call his device, retrieve the message and get the information he needs or return the call as soon as possible.

Paging services that provide a subscriber of the paging service with a portable pager and transmit at least numeric information to the pager are also well known and widely used. Each pager is assigned a specific telephone number, or a personal identification number (PIN) if the paging service uses a common telephone number for all of its pagers. A caller wishing to contact a paging service subscriber, dials the pager's telephone number, waits to receive acknowledgment of a connection to the paging service (usually in the form of a beep or voice prompt) and enters his telephone number or some other numeric message using a touch tone telephone key pad. The caller enters his telephone number or other numeric message during the pause that follows the prompt. In the case of a paging service that requires a PIN, the caller is prompted, by a synthesized voice or a beep, to enter the PIN and then prompted to enter his telephone number. The paging service will then transmit the information entered by the caller to the subscriber's pager. The amount of time that a caller must wait before he can enter his telephone number varies, depending on the specifications of the service and whether or not the service is busy. With some paging services, especially if the service is busy, it might take several rings before a connection is made and the caller receives a prompt. With other paging services, the caller might receive a prompt after just one ring or even no rings at all.

Although TADs that automatically page the user upon receipt of a message are known in the art, none of these devices address the problem of how to design a system that can be programmed to access virtually any type of paging service.

In order for a TAD to be able to access a paging service, it must be programmed so that it is compatible with all of the nuances of that service. There are many different types of paging services available today. Some paging services use a beep tone to prompt callers to enter the appropriate information. Some paging services, like many of the ones that require a PIN, prompt callers with a synthesized voice. Certain paging services sometimes seize the telephone line after one ring and sometimes after more than one ring. The amount of time it takes before a caller receives a prompt and is able to enter his telephone number varies from paging service to paging service and even from call to call within the same paging service.

Many prior art telephone answering devices that offer an automatic paging feature require the user to program the paging service telephone number along with the length of the pause that occurs between the time that the paging service telephone number is dialed and the numeric information is entered on the key pad. This places an unnecessary burden on the consumer to accurately determine the length of this pause and to then manually adapt his TAD to his paging service. In addition, many TADs with automatic page functions do not allow re-programming of the device in the event the user switches to a different paging service. Furthermore, some TADs with automatic page functions are only compatible with specific types of paging services.

U.S. Pat. No. 5,402,466 to Delahanty, discloses a device that detects if a valid message has been left on the telephone answering device and then dials a number that the user programs into the device corresponding to the telephone number of a paging service. Once the preprogrammed telephone number has been dialed, the device waits for an acknowledgment signal (generally a 1400 Hz tone according to Delahanty) from the paging service. The device will then forward a telephone number to the paging service subscriber if such a number has been entered into the TAD (via a touch tone key pad) by a caller. If the caller leaves a message, but does not enter a telephone number, the device will transmit a code (such as "2*") indicating that a voice message has been left. The Delahanty device can only be used with one class of pagers. The Delahanty device cannot respond to a synthesized voice prompt and cannot be used with a paging service that requires a caller to enter a subscriber's PIN before entering his own telephone number. Paging services that require a PIN often prompt the caller (with a voice or a beep) to enter the PIN and then prompt the caller to enter his own telephone number. The Delahanty device cannot transmit a PIN in response to a prompt. The Delahanty device can only respond to a single prompt by transmitting the caller's telephone number or a code that indicates the presence of a recorded message. In addition, Delahanty cannot be programmed to detect and respond to the pauses and audible signals that are present during the paging process.

U.S. Pat. No. 4,072,824 to Phillips discloses another device that detects messages left on a telephone answering device and, in response, dials the preprogrammed telephone number of a paging service. Phillips requires that the user use a decoding matrix, the inputs of which are connected to outputs of a dialing sequence circuit in order to program the particular digits to be dialed. The user of the Phillips device must physically connect the sequencer outputs to the selected input terminals of the decoder. For instance, if the first digit in the pager service telephone number is a 6, the user must connect the "1" of the sequencer to the "6" of the decoding matrix. As with Delahanty, the Phillips device can only respond to a single prompt and cannot be programmed to detect and respond to the pauses and audible signals that are present during the paging process. Phillips recognizes the need to have a device that is compatible with numerous types of paging systems. However, the Phillips device is intended for use with pagers without any type of display, that is, pagers that emit a beep tone only. Phillips does not allow for a telephone number or any other type of message to be transmitted to the pager after a caller has recorded a message on the TAD. A user of the Phillips device would have to use his pager for the exclusive purpose of retrieving messages recorded on his TAD.

U.S. Pat. No. 4,737,979 to Hashimoto also discloses a telephone answering device with a paging function. Hashimoto does not disclose how the user's pager number is programmed into the device, and the Hashimoto device cannot be used with a paging service that requires entry of a PIN after the connection has been made between the TAD and the paging service. As with Delahanty, the Hashimoto device cannot respond to a synthesized voice prompt and so can only be used with a limited variety of paging services. Like the Phillips device, moreover, the Hashimoto device is intended for use with a pager without any type of display. Also like Phillips, the Hashimoto device does not allow for any alpha-numeric data to be transmitted to a pager after a caller has recorded a message on the user's TAD and so a user of the Hashimoto device would have to use his pager for the exclusive purpose of retrieving messages recorded on his TAD.

U.S. Pat. No. 4,942,598 to Davis discloses a telephone answering device which can perform several operations depending on the identity of the caller. One of the operations disclosed by Davis is a paging operation whereby the user of the TAD is paged when a message is left on the TAD. The Davis device, however, is complicated and expensive as it requires that an automatic number identification decoder be included in the device. Davis also does not disclose how the user's pager number is programmed into the device and it does not appear that the Davis device can be used with a paging service that requires the entry of a PIN.

U.S. Pat. No. 4,961,216 to Baehr et al. discloses a telephone answering and paging system that stores a caller's message and automatically forwards caller information to another telephone or to the owner's portable pager. The Baehr et al. device uses a liquid crystal display (LCD) to prompt the user to enter "parameters", via a dual tone multi-frequency (DTMF) key pad, while in a programming mode. Baehr et al., however, does not disclose the nature of these parameters, so it is not clear how the device can respond to the prompts (beeps or voice) that a paging service sends to prompt a caller to enter numeric information. It appears that a user of the Baehr et al. device would have to measure the lengths of any pauses that occur during the paging process and manually enter these parameters, along with the digits of the paging service telephone number, on the DTMF key pad after being prompted to do so by instructions displayed on the LCD. This would be a difficult and time consuming process for the user. In addition, the Baehr et al. device is likely to be an expensive one due to the required use of a liquid crystal display. Baehr et al., moreover, does not disclose in any detail how the device will actually work when interfacing with a paging service and most likely this device cannot adapt to change (that is, if the paging service answers on one ring, two rings, no rings, etc.).

U.S. Pat. No. 4,065,642 to McClure discloses a telephone signaling and paging system that senses the presence of a message when recorded on a TAD and automatically dials a preselected telephone number to provide an alerting signal or page. A user of the McClure device must manually program the paging service telephone number using "selector switches". The user must also manually program the code that is used for the alerting signal. It does not appear that the McClure device can be programmed to pause for predetermined periods of time, nor does it appear that the device can respond to voice or beep prompts. It also appears that the McClure device is unable to transmit alpha-numeric information to a paging service, except for possibly the code that is used for the alerting signal. As with Baehr et al., McClure does not disclose how the device will actually be able to interface with a paging service and so it is likely that this device also cannot adapt to the variables present in the paging process.

Further, the Owners Guide for the Model 8450 TAD sold by PhoneMate, the assignee of the present application, discloses a method of programming a TAD to call a pocket pager. This procedure requires the owner to time a delay from the time that dialing is completed to the end of the pager's beeps, and to then physically enter pauses by pressing the REDIAL/PAUSE key an appropriate number of times. However, this delay time can vary with each call, depending on whether or not the paging service is busy. Also, in order for the owner to test the device to ensure that the pager number was correctly entered, it is required that another person call his machine and leave a message, which is very impractical.

Still further, the Page-Out Model 2101 sold by Dynamo Dresden, Inc. of San Antonio, Tex. is a device that connects to a TAD and dials a pager when a message is left on the TAD. This device is actually an embodiment of the aforementioned U.S. Pat. No. 5,402,466 to Delahanty. To program the device, the owner must time the length of their outgoing message (OGM) and physically enter this delay time (plus 3 seconds) after entering the pager number. To add additional pauses, the owner must enter the pound (#) sign. Each depression of the pound (#) sign adds a one second delay. This device allows a maximum of 14 digits when programming the pager number and each depression of the pound (#) sign counts as a number. Since a user is limited in the number of digits used to program the device, it is doubtful that this device will work with every type of pager. Also, as in the PhoneMate Model 8450, in order for the user to test the device to ensure that the pager number was correctly entered, another person would have to call the TAD and leave a message.

None of the above discussed prior art discloses a means of coping with the variety of paging services in existence. It would be desirable for a TAD to be able to allow a subscriber to a paging service, regardless of the type of paging service used, to be automatically notified when a message is left on his telephone answering device. It would be further desirable for the device to be compatible with a wide variety of paging services, be easy to use and be inexpensive.

SUMMARY OF THE INVENTION

Thus, it is an object of the present invention to provide a telephone answering device with an automatic page feature that will, upon receipt of a recorded message, automatically dial a paging service in order to page the user of the telephone answering device.

It is another object of the present invention to provide a telephone answering device with an automatic page feature that will, after automatically dialing the paging service and after a connection is made, transmit at least numeric information to the paging service that will thereafter be transmitted to a portable pager.

It is still another object of the present invention to provide a telephone answering device with an automatic page feature that is compatible with a wide variety of paging services.

It is yet another object of the present invention to provide a telephone answering device with an automatic page feature that allows for easy programming of the user's paging service telephone number and allows the telephone answering device to be re-programmed if the user changes paging services.

It is a further object of the present invention to provide a telephone answering device with an automatic page feature that can be programmed to memorize key presses by the user as well as automatically store information representing any pauses and audible signals which may be present during the paging process.

It is still a further object of the present invention to provide a telephone answering device with an automatic page feature that allows the user to easily perform a test of the device to insure that the paging service telephone number has been properly programmed.

It is yet a further object of the present invention to provide a telephone answering device with an automatic page feature that allows the user to selectively enable and disable the page feature.

In order to achieve the above objects, the present invention comprises a telephone answering device including: a line interface circuit coupled to a telephone line; a dual tone multi-frequency generator coupled to the line interface circuit for generating dual tone multi-frequency signals to the telephone line; a record and playback unit coupled to the line interface circuit for recording and playing back at least a caller's message; a VOX circuit coupled to the telephone line for automatically detecting a presence of audible signals on the telephone line; a memory for storing at least numeric information; and a controller. The controller controls the line interface circuit to seize the telephone line in response to a message being recorded on the record and playback unit, subsequently controls the dual tone multi-frequency generator to dial a predetermined telephone number that is stored in the memory, and then controls the dual tone multi-frequency generator to transmit at least numeric information over the telephone line once the VOX circuit ceases to detect a presence of audible signals on the telephone line for a predetermined period of time. User actuated keys are provided for enabling a user to program the telephone answering device, test that the predetermined telephone has been correctly stored, and selectively enable or disable the dual tone multi-frequency generator.

BRIEF DESCRIPTION OF THE DRAWINGS

FIGS. 7A, 7B and 7C show different configurations of a memory buffer for storing the telephone number of a paging service, along with the numeric information to be transmitted to a user's portable pager.

DETAILED DESCRIPTION

Figure 1:
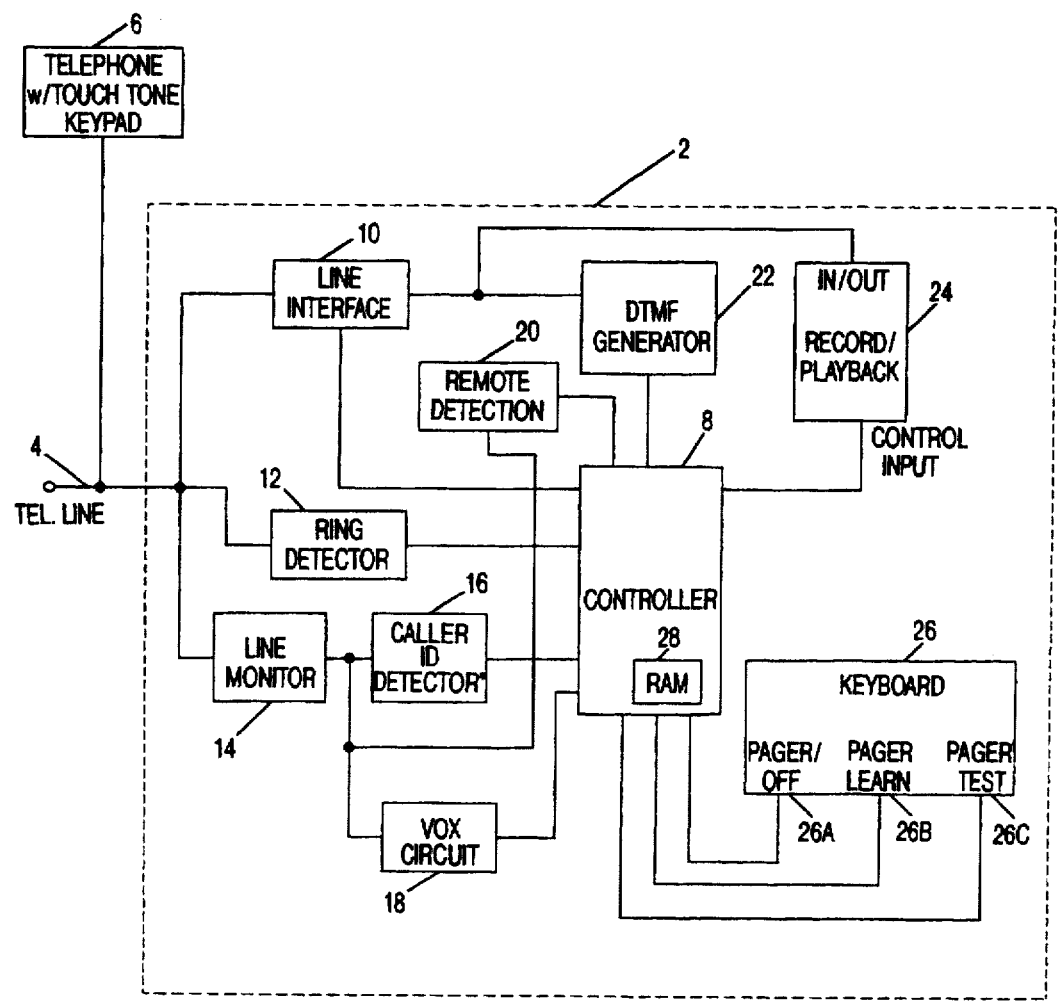
FIG. 1 is a generalized block diagram of an adjunct telephone answering device (TAD) in accordance with the present invention.

According to the present invention, a telephone answering device (TAD) can be programmed to automatically dial any paging service regardless of the specifications of that paging service, and transmit at least numeric information that will be further transmitted to a portable pager.

The message record and playback features of the telephone answering device of the present invention work in much the same way as those features in standard telephone answering devices. When a call goes unanswered for a predetermined number of rings, the TAD seizes the telephone line and an outgoing message (OGM) is played to the line. If the caller wishes to leave a message, he or she may do so after hearing a beep tone indicating that the TAD is in a record mode. After leaving a message, the caller hangs up and the TAD resets to await the next call.

The TAD of the present invention differs from conventional telephone answering devices in that, after resetting itself once the caller hangs up, it automatically dials a preprogrammed telephone number of the paging service the user subscribes to. Once the TAD is connected to the paging service, it waits for the pause that follows the prompt before dialing the necessary numbers that will be transmitted by the paging service to the TAD user's portable pager (which is provided by the paging service). At this point, the TAD of the present invention goes on hook and resets to await the next call. The numeric information that is transmitted to the portable pager can be the telephone number of the TAD user, the security code of the TAD and/or the number of messages on the TAD. If the TAD has been equipped with a caller identification (caller ID) detector and if the TAD user subscribes to this feature through the telephone company, the telephone number of the caller who left a message can be transmitted to the portable pager. The exact nature of the numeric information that is to be transmitted to the portable pager is a parameter for the TAD designer to determine.

The method used by the TAD of the present invention to program the device to be able to access the paging service is unique in that it accommodates any type of paging service. When a user wishes to program the TAD to be able to access his paging service, he presses a Pager Learn key after which he dials the telephone number of his paging service using either an extension telephone connected in parallel with the TAD (for an adjunct TAD) or using the key pad of the TAD itself (for a TAD with an integrated telephone). The TAD stores these dialed digits in memory. The user must now wait for a connection to the paging service. After a connection to the paging service is made, the user will be prompted to enter a numeric message either by a tone or a synthesized voice (depending on the type of paging service). Upon receiving the tone or voice prompt, the user simply enters a predetermined series of digits (such as the TAD's security code) and hangs up or presses the Pager Learn key to end the programming process. The predetermined series of digits will act as instructions to the TAD to pause and transmit numeric data during the paging process. If the paging service requires the entry of a personal identification number (PIN), the user enters the PIN (after being prompted to do so), followed by the predetermined series of digits, and then hangs up or presses the Pager Learn key.

It does not matter what type of prompt is used or how long (or how many rings) it takes for the TAD to connect to the paging service because the TAD stores information representing the pauses and VOX activity between key presses as well as the digits themselves. VOX activity is detected by a VOX circuit which is a well known means of detecting audible activity including voice and tones on the telephone line. During the programming process, the TAD will continue to store digits and automatically note pauses and VOX activity between key presses until the predetermined digit sequence is received. Therefore, regardless of how long (or how many rings) it takes for the paging service to answer and regardless of whether the paging service uses a tone or a voice prompt or requires the entry of a PIN, the TAD of the present invention will still be able to accommodate any paging service.

After the user has programmed the TAD to access his paging service, he can test the TAD to make sure that the paging service telephone number was correctly stored in memory. The user does this by pressing a Pager Test key. Pressing this key instructs the TAD to dial the telephone number that is stored in memory. After a connection has been made to the paging service, the TAD transmits a predetermined test code, such as "123" or the TAD's security code. This test code will then be transmitted to the user's pager and in this manner the user can be assured that the TAD has been successfully programmed. The Pager Test key can also act as a "one touch" way to page the user. For example, if a person located at the TAD were to press the Pager Test key, the predetermined test code would be displayed on the user's pager thus alerting him to call his home, office, etc.

The TAD of the present invention also allows the user to selectively enable or disable the automatic page feature by pressing a Pager/Off key. When the automatic page feature is enabled, the TAD will dial the paging service with each message that is recorded. When the automatic page feature is disabled, the TAD will not dial the paging service. Alternatively, the TAD can be programmed to "page on demand", whereby the user receives a page only when a caller issues a dual tone multi-frequency command (such as by pressing the "#" key) after leaving a message.

Referring to the drawings, and initially to FIG. 1 thereof, an adjunct telephone answering device (TAD) 2 according to the present invention is connected to a telephone line 4 in parallel with a touch tone telephone 6. Specifically, TAD 2 includes a line interface 10, a ring detector 12 and a line monitor 14, each connected to telephone line 4. An optional caller identification detector 16, a VOX circuit 18 and a remote detection circuit 20 are each connected to line monitor 14, while a dual tone multi-frequency (DTMF) generator 22, and a record/playback unit 24 are each connected to line interface 10.

TAD 2 includes a controller 8 that controls or monitors the operation of line interface circuit 10, ring detector 12, line monitor 14, optional caller identification detector 16, VOX circuit 18, remote detection circuit 20, dual tone multi-frequency (DTMF) generator 22, record/playback unit 24 and a keyboard 26.

Ring detector 12 monitors telephone line 4 for the detection of ringing signals sent from the central office. When a ring occurs, the caller identification detector 16 (if installed) detects the caller's information, that is, the name and telephone number of the caller. This information is stored in memory (RAM) 28 for later use. If a predetermined number of rings occurs with no answer, line interface circuit 10, under control of controller 8, seizes telephone line 4 and record/playback unit 24 plays an OGM to the line 4. The OGM usually instructs the caller to leave a message for the user of the TAD 2. After the caller records a message on the record/playback unit 24 and hangs up, the TAD 2 drops the telephone line 4 and re-seizes it to get a new dial tone. Then, the DTMF generator 22, under control of the controller 8, dials a preprogrammed telephone number corresponding to that of a paging service. After connection to the paging service has been established, the DTMF generator 22 transmits a numeric message to the paging service which, in turn, transmits the numeric message to the user's pager. This numeric message might be any of the following: the caller's telephone number (if the caller identification detector 16 is used), the telephone number of the TAD 2, the number of messages on the TAD 2, or the security code of the TAD 2. The user of the TAD 2 can then call and retrieve his messages from a remote location by entering a security code on the remote telephone's touch tone key pad. The security code is detected by the remote detection circuit 20, under control of the controller 8. After receiving the correct security code, the controller 8 causes the record/playback unit 24 to playback any recorded messages over the telephone line 4.

In addition to the typical keys used to control the TAD 2, the keyboard 26 has at least the following three keys: Pager/off 26A, Pager Learn 26B, and Pager Test 26C. These keys allow the TAD 2 to be programmed to page the user and transmit a numeric message to a portable pager. The Pager Learn key 26B is pressed when the user wants to program the TAD 2 to be able to access the paging service. After pressing the Pager Learn key 26B, the user then takes any telephone 6 (which is connected to the same telephone line 4 as the TAD 2) off-hook and dials the telephone number of his paging service on the telephone's touch tone key pad 6. After the user's paging service has answered and prompted him to enter a telephone number, he then dials a predetermined end series of digits, such as the three digit security code of the TAD 2, to end the learning process. If the paging service is one that requires the entry of a PIN, the user dials his PIN before dialing the end series of digits. The line monitor 14, which is a high input impedance circuit, allows the TAD 2 to monitor the telephone line 4 without being in an off-hook state and allows the remote detector 20 to detect the digits (DTMF tones) that were dialed by the user. The controller 8 stores the telephone number of the paging service (and the PIN, if appropriate) in RAM 28 and automatically stores information representing the pauses and VOX activity (as detected by the VOX circuit 18) that occur prior to the user dialing the end series of digits. The end series of digits that is dialed in response to the prompt instructs the controller 8 to pause and then transmit a numeric message, via the DTMF generator 22, to the paging service.

The Pager Test key 26C allows the user to test the device after it has been programmed. When the Pager Test key 26C is pressed, the controller 8 instructs the DTMF generator 22 to dial the user's paging service telephone number and then transmit a predetermined test code, such as "123" or the TAD's security code, to the paging service. When the predetermined test code appears on the user's portable pager, he is assured that the TAD 2 is programmed correctly. The Pager Test key 26C can also be a handy way for a person, who is located at the TAD 2, to page the user.

The Pager/off key 26A is a toggle key that allows the user to selectively set the TAD 2 to forward all calls to his pager. When the TAD 2 is set to Pager mode, every time a message is recorded on the TAD 2, a numeric message will be transmitted to the user's pager. When the Pager mode is turned off (by pressing the Pager/off key 26A) the user will not receive notification that a message has been recorded. If the TAD 2 is programmed to provide a "page on demand" feature and the Pager mode is turned off, the user will only be paged by those callers who issue a DTMF command (such as "#") after leaving a message.

Figure 2:
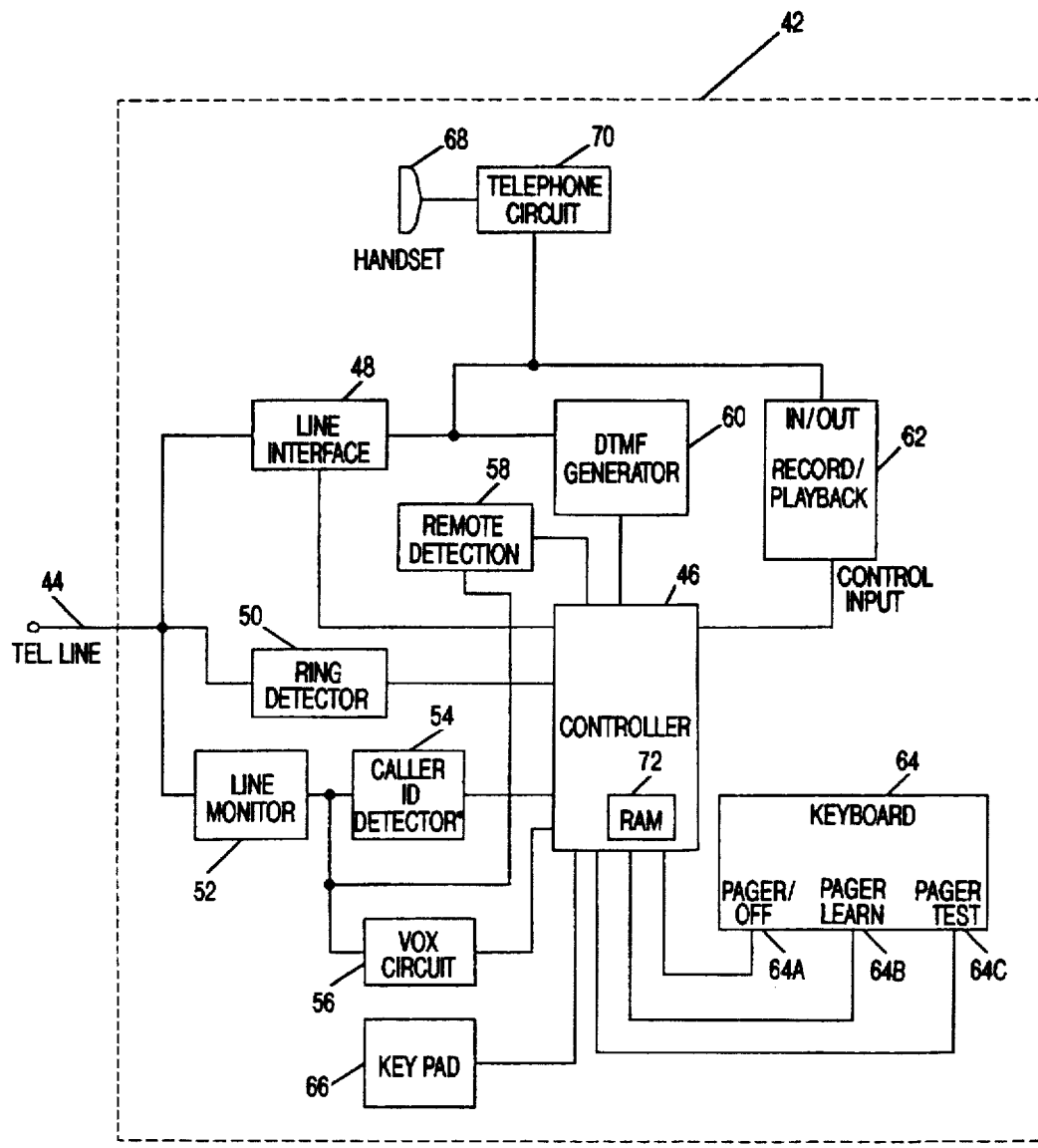
FIG. 2 is a generalized block diagram of an integrated telephone/telephone answering device (ITAD) in accordance with the present invention.

Referring now to FIG. 2, an integrated telephone/telephone answering device (ITAD) 42 according to the present invention is connected to a telephone line 44. The ITAD 42 includes a controller 46 that controls or monitors the operation of a line interface circuit 48, a ring detector 50, a line monitor 52, an optional caller identification detector 54, a VOX circuit 56, a remote detection circuit 58, a DTMF generator 60, a record/playback unit 62, a keyboard 64, a key pad 66, a handset 68 and a telephone circuit 70. The controller 46 contains a RAM 72. The ITAD 42 works in the same manner as the TAD 2 of FIG. 1, as discussed above, except that the ITAD 42 has all the elements required for standard telephone operations, including the telephone circuit 70, the key pad 66 and the handset 68. The keyboard 64 and the three keys (Pager/Off 64A, Pager Learn 64B, Pager Test 64C) also work in the same manner as the keyboard 26 and keys (26A, 26B, 26C) of FIG. 1, as discussed above. The ITAD 42 is also programmed in the same way as the TAD 2 of FIG. 1, with the exception that the user dials the required digits on the integrated key pad 66 of the ITAD 42 rather than on the key pad of a parallel telephone 6, as shown in FIG. 1.

If the optionally provided caller ID detector 54 is omitted, then it is replaced by a direct line connection of the line monitor 52 to the controller 46.

Figure 3:
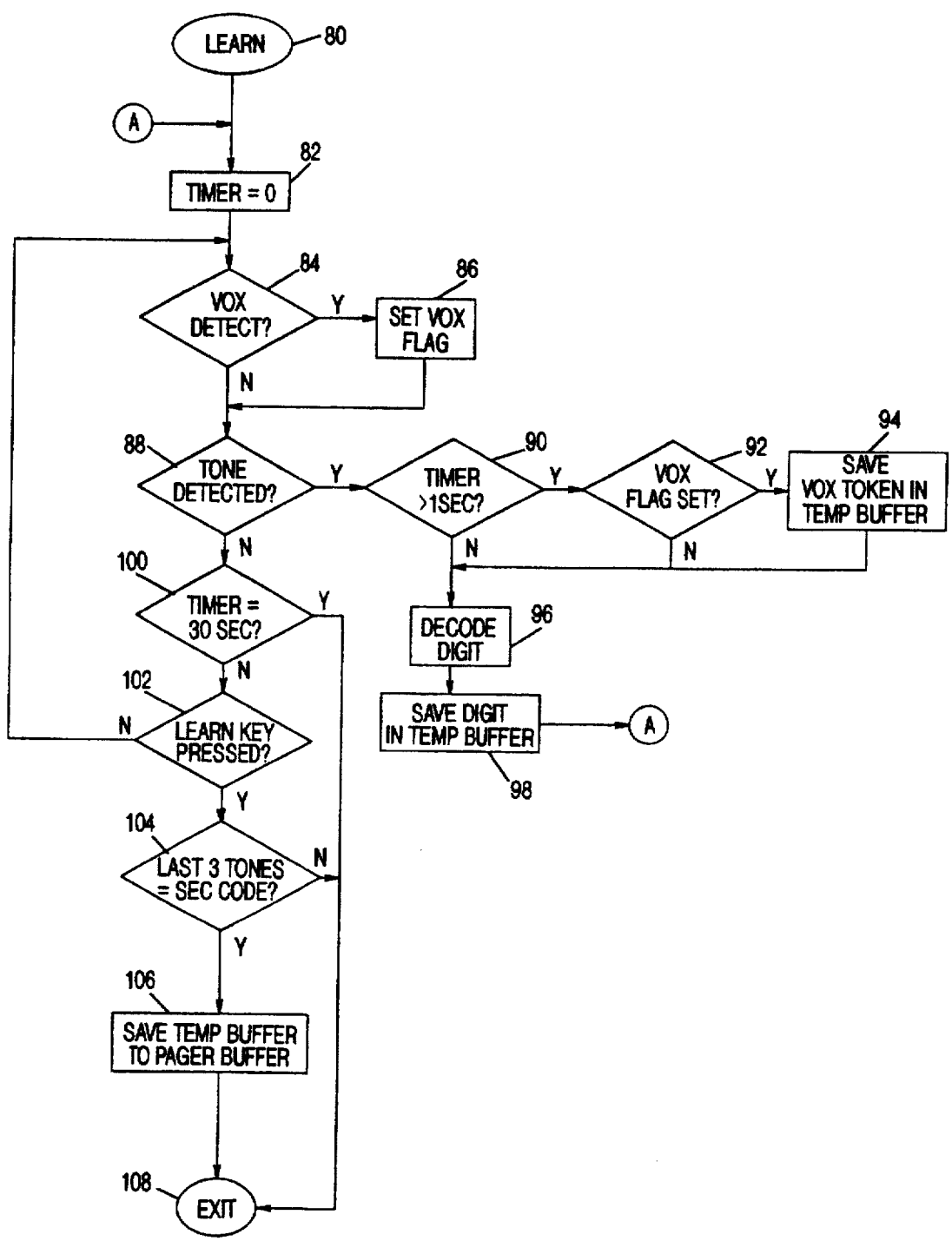
FIG. 3 is a flow diagram showing a learn algorithm for programming an adjunct TAD to be able to access a paging service.

FIG. 3 is a flow diagram showing an algorithm used by the TAD of FIG. 1 to learn the telephone number of a paging service. The learn mode 80 is entered when the Pager Learn key 26B is pressed. Upon entering the learn mode 80, a timer is started from 0 seconds (step 82). Then, the process enters a loop that monitors the VOX circuit 18, the remote detection circuit 20 and the timer. If an audible signal from the telephone line is detected (yes in step 84), a VOX FLAG is set (step 86) and the routine continues to the next step 88. If VOX activity is not detected (no in step 84), the routine continues to the next step 88. If a tone is detected (yes in step 88), then a key has been pressed and the routine checks the timer to see if the time is greater than 1 second (step 90). If the time is greater than 1 second (yes in step 90), indicating a pause in dialing, the routine checks to see if the VOX FLAG has been set (step 92). If the VOX FLAG has been set (yes in step 92), then a VOX TOKEN is saved in the temporary buffer (step 94). A VOX TOKEN instructs the test routine and the page routine (described below with respect to FIGS. 5 and 6) to wait until all VOX signals stop before proceeding. The digit is then decoded (step 96), saved in the temporary buffer (step 98) and the timer is reset to 0 (step 82). If the VOX FLAG has not been set (no in step 92), the digit is immediately decoded (step 96), saved in the temporary buffer (step 98) and the timer is reset to 0 (step 82). If, in step 90, the time is not greater than 1 second, the digit is immediately decoded (step 96), saved in the temporary buffer (step 98) and the timer is reset to 0 (step 82). If no tone is detected (no in step 88), the routine checks the timer to see if the time equals 30 seconds (step 100). If the time equals 30 seconds (yes in step 100), it is assumed that the user has abandoned the procedure and the routine aborts (step 108).

If the time does not equal 30 seconds (no in step 100), the routine checks to see if the Pager Learn key 26B has been pressed (step 102). If the Pager Learn key 26B has not been pressed (no in step 102), it is assumed that the user is still in the midst of the procedure and the routine returns to step 84. If the Pager Learn key 26B has been pressed (yes in step 102), the routine checks to see if the last three tones are equal to the security code of the TAD 2 (step 104). (It should be noted that any predetermined end series of tones can be used instead of the security code. For the sake of simplicity, however, the embodiments described herein use the security code as predetermined end series of tones.) If the last three tones are equal to the security code (yes in step 104), then the learning procedure is completed, the temporary buffer is saved to the pager buffer (step 106) and the routine exits (step 108). If the last three tones are not equal to the security code (no in step 106), it is assumed that a user error has occurred and the routine aborts (step 108).

Figure 4:
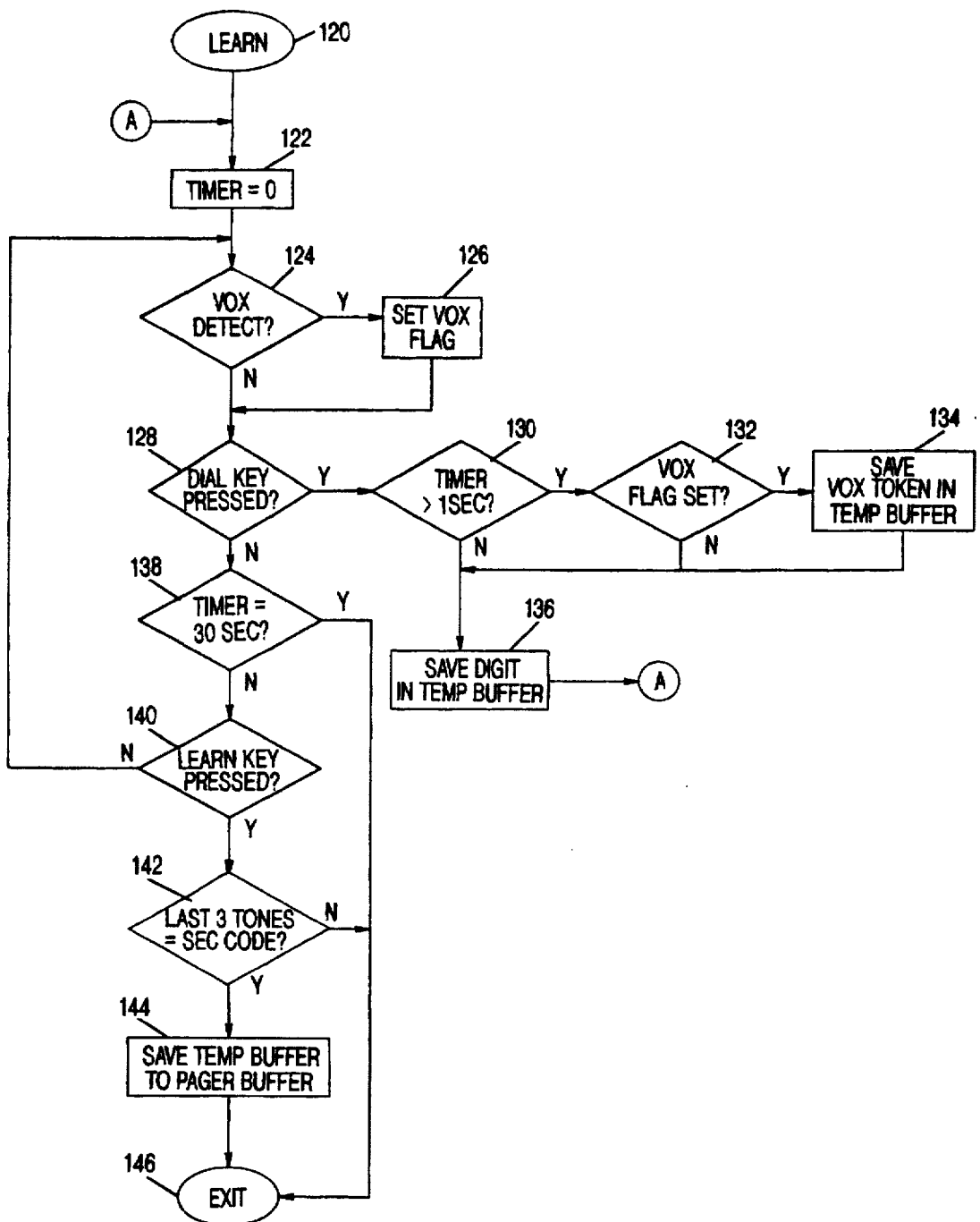
FIG. 4 is a flow diagram showing a learn algorithm for programming an ITAD to be able to access a paging service.

FIG. 4 is a flow diagram showing an algorithm used by the ITAD of FIG. 2 to learn the telephone number of a paging service. The learn mode 120 is entered when the Pager Learn key 64B is pressed. Steps 122 through 146 of FIG. 4 are the same as steps 82 through 108, respectively, of FIG. 3 described above, with the only difference being that step 96 of FIG. 3 is not needed because the ITAD 42 has its own key pad 66, and therefore it is not necessary to decode the digit.

Figure 5:
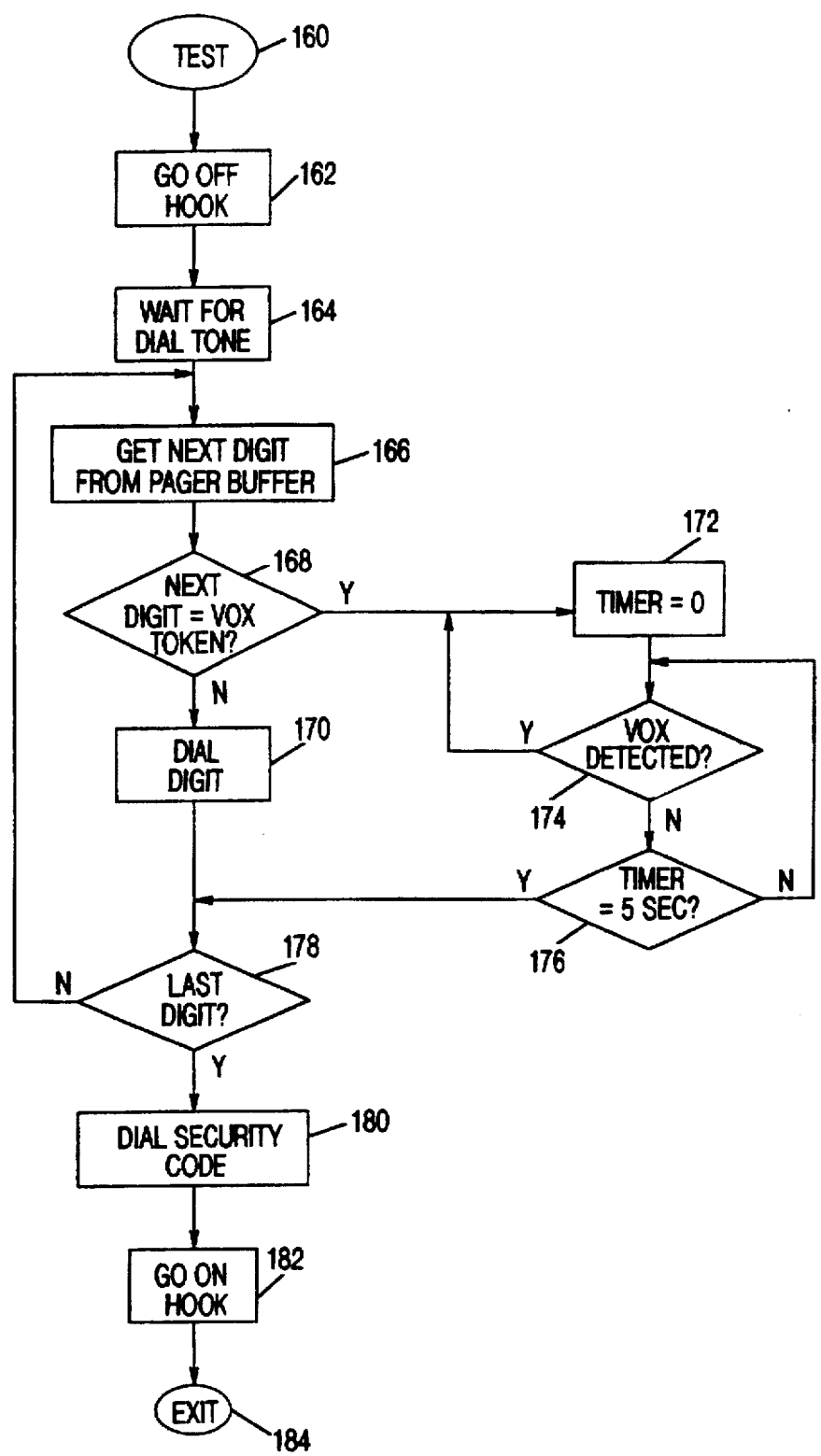
FIG. 5 is a flow diagram showing a test algorithm for ensuring that the paging service telephone number has been correctly stored in memory.

FIG. 5 is a flow diagram showing an algorithm used by either the TAD or the ITAD of FIGS. 1 and 2, respectively, to test the device after the learn procedure (FIGS. 3 and 4) has been completed. The test procedure allows the user to make sure that the correct paging service telephone number has been stored in memory. The test mode 160 is entered after the Pager Test key 26C (FIG. 1) or 64C (FIG. 2) is pressed. After the Pager Test key 26C or 64C is pressed, the device goes off hook (step 162) and waits for a dial tone (step 164). The routine then gets the next digit from the pager buffer (step 166) and checks to see if the next digit is a VOX TOKEN (step 168). If the next digit is not a VOX TOKEN (no in step 168), then the routine dials that digit (step 170) and proceeds to the next step 178.

If the next digit is a VOX TOKEN (yes in step 168), the process waits for VOX signals to end for a period of 5 seconds. First, a timer is started from 0 seconds (step 172), and then the routine checks to see if VOX signals have been detected (step 174). If VOX has been detected (yes in step 174), indicating that there is audible activity on the telephone line, the timer is reset to 0 (step 172) and the process waits for the VOX signals to end. If VOX has not been detected (no in step 174), the routine checks to see if the time is equal to 5 seconds (step 176). If the time is not equal to 5 seconds (no in step 176), the routine returns to step 174. If the time equals 5 seconds (yes in step 176), indicating that a 5 second pause in VOX activity has been noted, the routine proceeds to step 178. In step 178, the process checks to see if the previous digit dialed was the last digit stored in the pager buffer. If it was not the last digit (no in step 178), the routine returns to step 166 and gets the next digit from the pager buffer. If it was the last digit (yes in step 178), then the security code is dialed in step 180, which will be transmitted to the user's pager and which tells the user that the pager number has been successfully stored in memory, the device goes on hook (step 182) and the routine exits (step 184). (Again, the embodiments described herein use the security code as the predetermined test code for the purpose of simplicity. Any predetermined test code can be dialed in step 180 and the same result would be achieved.)

Figure 6:
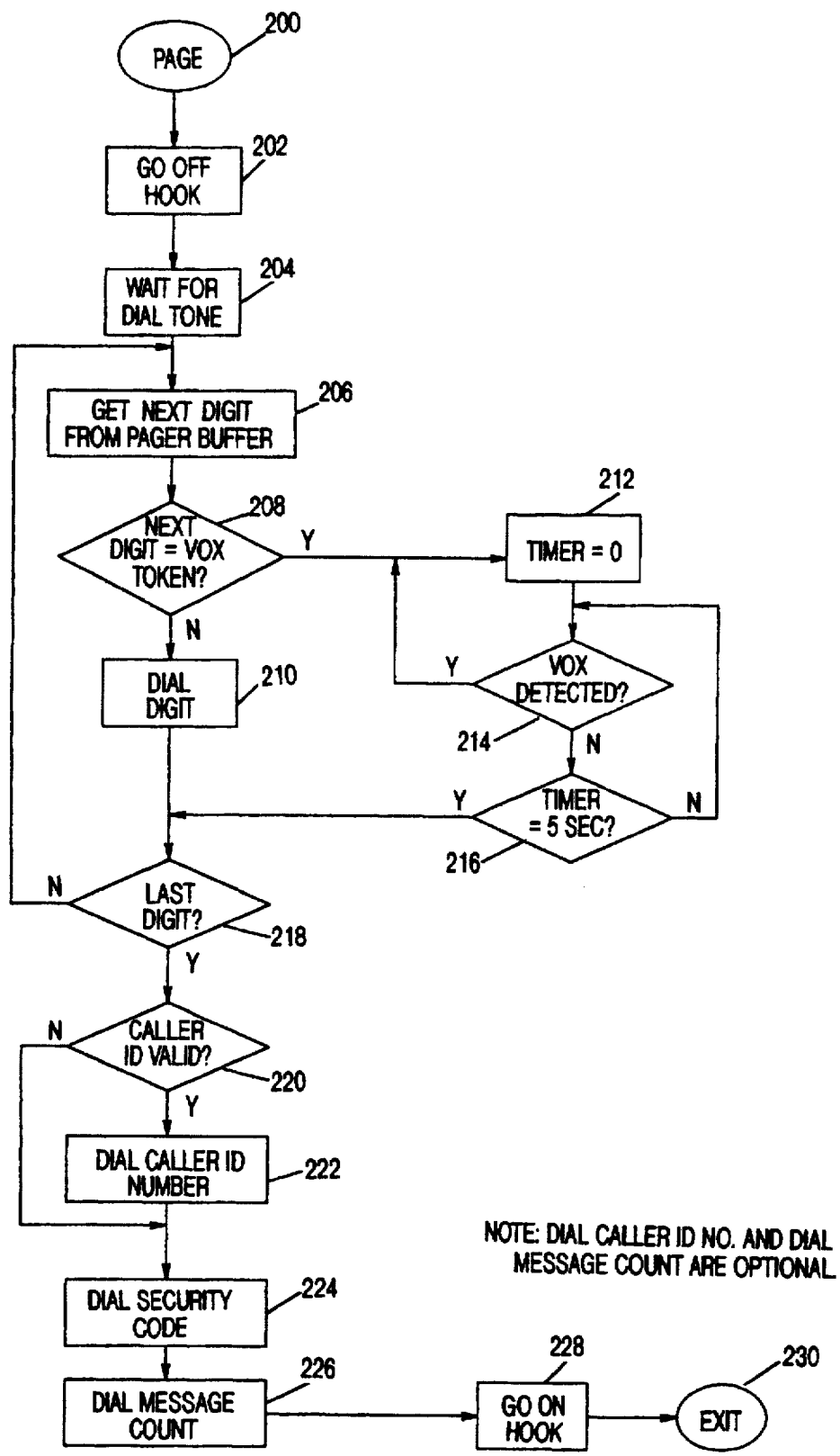
FIG. 6 is a flow diagram showing a page algorithm used by a TAD or ITAD for paging a user and transmitting a numeric message.

FIG. 6 is a flow diagram showing an algorithm used when either the TAD or the ITAD of FIGS. 1 and 2, respectively, pages a user. The page mode 200 is entered after a caller leaves a message on a user's TAD or ITAD, assuming that the page mode has not been disabled by pressing the Pager/Off key 26A or 64A. After the page mode 200 is entered, the device goes off hook (step 202) and waits for a dial tone (step 204). The routine then gets the next digit from the pager buffer (step 206) and checks to see if the next, digit is a VOX TOKEN (step 208). If the next digit is not a VOX TOKEN (no in step 208), then the routine dials that digit (step 210) and proceeds to the next step 218. If the next digit is a VOX TOKEN (yes in step 208), the process waits for VOX signals to end for a period of 5 seconds. First, a timer is started from 0 seconds (step 212), then the routine checks to see if VOX signals have been detected (step 214). If VOX has been detected (yes in step 214), indicating that there is audible activity on the telephone line, the timer is reset to 0 (step 212) and the process waits for the VOX signals to end. If VOX has not been detected (no in step 214), the routine checks to see if the timer is equal to 5 seconds (step 216). If the timer is not equal to 5 seconds (no in step 216), the routine returns to step 214. If the time equals 5 seconds (yes in step 216), indicating that a 5 second pause in VOX activity has been noted, the routine proceeds to step 218.

In step 218, the process checks to see if the previous digit dialed was the last digit stored in the pager buffer. If it was not the last digit (no in step 218), the routine returns to step 206 and gets the next digit from the pager buffer. If it was the last digit (yes in step 218), the routine then checks to see if the caller identification information (if an optional caller identification detector is used) is valid (step 220). If the caller identification information is valid (yes in step 220), then the caller's identification information is dialed (step 222), the security code is dialed (step 224) and optionally, the message count is dialed (step 226). The device then goes on hook (step 228) and the routine exits (step 230). This information will be transmitted to the user's pager. If the caller identification information in not valid (no in step 220), then the routine skips to step 224 and proceeds as discussed above.

FIGS. 7A, 7B and 7C show different configurations of the memory buffer that stores the paging service telephone number along with the numeric information that will be transmitted to the user's pager. In FIG. 7A, the first eight blocks of the buffer comprise the telephone number of the paging service followed by a VOX TOKEN. The VOX TOKEN instructs the page or test software to wait for prompts to end before proceeding to dial the next digit. The next three blocks comprise the security code of the user's TAD or ITAD. The security code is transmitted so as to let the user know that the page originated from his TAD or ITAD. The last two blocks comprise the message count which includes a "star" DTMF code and the number of messages that have been recorded on the user's TAD or ITAD. The "star" DTMF code delineates between the fields of information that will be displayed on the user's pager. The message count is transmitted because there may be times when the user turns his pager off and so he may not be aware of all the messages that have been recorded.

In FIG. 7B, the first eight blocks of the buffer also comprise the telephone number of the paging service followed by a VOX TOKEN. The VOX TOKEN is used here for the same purpose as was discussed above with respect to FIG. 7A. The paging service in this example requires the entry of a PIN, so the following four blocks contain the digits of the PIN and a second VOX TOKEN. The next three blocks comprise the security code of the user's TAD or ITAD. The last two blocks comprise the message count which includes a "star" DTMF code and the number of messages that have been recorded on the user's TAD or ITAD. The "star" DTMF code is used here for the same purpose as was discussed above with respect to FIG. 7A.

In FIG. 7C, the first eight blocks of the buffer again comprise the telephone number of the paging service followed by a VOX TOKEN. The TAD or ITAD in this example contains a caller identification detector, so the following eight blocks contain the digits of the caller's telephone number and a "star" DTMF code. The "star" DTMF code here delineates between the caller's telephone number and subsequent fields of information. The next three blocks comprise the security code of the user's TAD or ITAD. The last two blocks comprise the message count which includes a "star" DTMF code and the number of messages that have been recorded on the user's TAD or ITAD.

Having described specific preferred embodiments of the invention with reference to the accompanying drawings, it will be appreciated that the present invention is not limited to those specific embodiments, and that various modifications can be effected thereto by one of ordinary skill in the art without departing from the scope or spirit of the invention, as defined in the appended claims.

What is claimed is:

1. A telephone answering device comprising:

a line interface circuit coupled to a telephone line;

a dual tone multi-frequency generator coupled to the line interface circuit for generating dual tone multi-frequency signals to the telephone line;

a record and playback unit coupled to the line interface circuit for recording and playing back at least a caller's message;

a VOX circuit coupled to the telephone line for automatically detecting a presence of audible signals on the telephone line;

a memory for storing at least numeric information and at least one identifier representing a detection of the presence of audible signals on the telephone line by the VOX circuit; and a controller for controlling the line interface circuit to seize the telephone line in response to a message being recorded on the record and playback unit, for subsequently controlling the dual tone multi-frequency generator to dial a predetermined telephone number that is stored in the memory, and for then controlling the dual tone multi-frequency generator to transmit at least numeric information over the telephone lines wherein transmission of the numeric information by the controller is paused until the VOX circuit ceases to detect the presence of audible signals on the telephone line for a predetermined period of time each time the at least one identifier is detected.

2. The telephone answering device according to claim 1, wherein the predetermined telephone number stored in the memory is that of a paging service, and the audible signals comprise an audible prompt.

3. The telephone answering device according to claim 1, further comprising a keyboard coupled to the controller, the keyboard comprising a first user actuated key for enabling a user to program the telephone answering device so that the controller controls the dual tone multi-frequency generator to dial the predetermined telephone number in response to a message being recorded on the record and playback unit and to subsequently transmit the at least numeric information over the telephone line.

4. The telephone answering device according to claim 3, wherein said keyboard further comprises a second user actuated key for enabling the user to test the telephone answering device after the telephone answering device has been programmed, said test comprising said controller controlling the dual tone multi-frequency generator to dial the predetermined telephone number in response to actuation of the second user actuated key and to further transmit a predetermined test series of digits over the telephone line, wherein transmission of the predetermined test series of digits by the controller is paused until the VOX circuit ceases to detect the presence of audible signals on the telephone line for a predetermined period of time each time the at least one identifier is detected.

5. The telephone answering device according to claim 4, wherein said keyboard further comprises a third user actuated key for alternately enabling and disabling the dual tone multi-frequency generator, thereby alternately enabling and disabling the ability of the telephone answering device to dial the predetermined telephone number in response to the message being recorded on the record and playback unit.

6. The telephone answering device according to claim 3, further comprising:
    a line monitor coupled between the telephone line and the VOX circuit, the line monitor comprising a high input impedance circuit that allows the telephone answering device to monitor the telephone line without being in an off hook condition; and
    a remote detection circuit, coupled to an output of the line monitor and an input of the controller, for detecting dual tone multi-frequency signals on the telephone line.

7. The telephone answering device according to claim 6, wherein, in response to actuation of the first user actuated key, the user programs the telephone answering device by dialing digits on a parallel connected telephone.

8. The telephone answering device according to claim 3, further comprising an integrated telephone with a touch tone key pad coupled to at least said record and playback unit.

9. The telephone answering device according to claim 8, wherein, upon actuation of the first user actuated key, the user programs the telephone answering device by dialing digits on the touch tone key pad of the integrated telephone.

10. The telephone answering device according to claim 1, further comprising a line monitor coupled between the telephone line and the VOX circuit, the line monitor comprising a high input impedance circuit that allows the telephone answering device to monitor the telephone line without being in an off hook condition.

11. The telephone answering device according to claim 10, further comprising:
    a caller identification detector, having an input coupled to the line monitor and an output coupled to the controller, for detecting at least the caller's telephone number; and
    wherein the memory includes a storage device for storing at least the caller's telephone number, and the dual tone multi-frequency generator includes a transmitting device for transmitting at least the stored caller's telephone number over the telephone line after the predetermined telephone number has been dialed in response to the message being recorded by the caller on the record and playback unit.

12. A method of programming a telephone answering device to dial a predetermined telephone number in response to a message being recorded on the telephone answering device, and to subsequently transmit at least numeric information over a telephone line, the method comprising the steps of:
    detecting actuation of a user actuated key for instructing programming to begin;
    detecting digits entered on a touch tone key pad;
    storing the detected digits in a memory;
    dialing the detected digits;
    automatically detecting a presence of audible activity on the telephone line;
    storing information representing the automatically detected presence audible activity;
    pausing until the presence of audible activity is no longer detected on the line for a predetermined period of time;
    detecting at least an additional digit that is entered on the touch tone key pad;
    dialing at least the additional digit;
    determining if an end series of digits entered on the touch tone key pad is equal to a predetermined end series of digits; and
    ending programming if the end series of digits is equal to the predetermined end series of digits.

13. The method of programming a telephone answering device according to claim 12, wherein the method of programming a telephone answering device to dial a predetermined telephone number comprises programming the telephone answering device to dial a telephone number of a paging service.

14. A method of testing a telephone answering device programmed to dial a predetermined telephone number in response to a message being recorded on the telephone answering device to determine if the predetermined telephone number has been stored correctly, the method comprising the steps of:
    detecting actuation of a user actuated key for instructing testing to begin;
    dialing the predetermined telephone number;
    automatically detecting information representing a presence of audible activity;
    automatically responding to a detection of information representing the presence of audible activity by pausing until the presence of audible activity is no longer detected on the line for a predetermined period of time;
    dialing a predetermined test series of digits to be transmitted over the telephone line; and
    ending testing after the predetermined test series of digits has been dialed.

15. The method of testing a telephone answering device according to claim 14, wherein the method of testing a telephone answering device programmed to dial a predetermined telephone number comprises testing a telephone answering device programmed to dial a telephone number of a paging service.

16. The method of testing a telephone answering device according to claim 15, wherein the step of dialing a predetermined test series of digits comprises dialing a test series of digits indicating that the predetermined telephone number has been stored correctly, the test series of digits being transmitted by the paging service to a pager of the user of the telephone answering device.

17. A method of dialing a predetermined telephone number in response to a message being recorded on a telephone answering device, and subsequently transmitting at least numeric information over a telephone line, the method comprising the steps of:
    dialing the predetermined telephone number;
    automatically detecting information representing a presence of audible activity;
    automatically responding to a detection of information representing the presence of audible activity by pausing until the presence of audible activity is no longer detected on the line for a predetermined period of time;
    dialing a series of digits representing the at least numeric information to be transmitted over the telephone line.

18. The method of dialing a predetermined telephone number according to claim 17, wherein prior to the step of dialing a series of digits representing the at least numeric information, the method further comprises the steps of:
dialing an additional series of digits;
automatically detecting information representing a presence of additional audible activity; and
automatically responding to the detection of information representing the presence of additional audible activity on the telephone line by pausing until the presence of additional audible activity is no longer detected on the line for a predetermined period of time.

* * * * *